United States Patent
Chang et al.

(10) Patent No.: US 10,992,064 B2
(45) Date of Patent: Apr. 27, 2021

(54) MOBILE DEVICE

(71) Applicant: Wistron Corp., New Taipei (TW)

(72) Inventors: Yu-Chia Chang, New Taipei (TW);
Wan Chu Wei, New Taipei (TW);
Chun-Hong Kuo, New Taipei (TW);
Tsung-Te Lin, New Taipei (TW)

(73) Assignee: WISTRON CORP., New Taipei (TW)

( * ) Notice: Subject to any disclaimer, the term of this patent is extended or adjusted under 35 U.S.C. 154(b) by 5 days.

(21) Appl. No.: 16/416,332

(22) Filed: May 20, 2019

(65) Prior Publication Data
US 2020/0313308 A1 Oct. 1, 2020

(30) Foreign Application Priority Data
Mar. 29, 2019 (TW) .................... 108111140

(51) Int. Cl.
*H01Q 21/28* (2006.01)
*H04B 7/0426* (2017.01)
*H01Q 21/29* (2006.01)
*H01Q 1/50* (2006.01)

(52) U.S. Cl.
CPC ............ *H01Q 21/28* (2013.01); *H01Q 1/50* (2013.01); *H01Q 21/29* (2013.01); *H04B 7/0426* (2013.01)

(58) Field of Classification Search
CPC .......... H01Q 21/28; H01Q 1/50; H01Q 21/29; H04B 4/0426; H04B 7/0456; H04B 7/0602
See application file for complete search history.

(56) References Cited

U.S. PATENT DOCUMENTS

| 9,900,894 B2 | 2/2018 | Jung et al. |
| 2013/0241798 A1 | 9/2013 | Lee et al. |
| 2016/0381618 A1 | 12/2016 | Sayem et al. |

(Continued)

FOREIGN PATENT DOCUMENTS

| CN | 104167591 A | 11/2014 |
| CN | 104362439 A | 2/2015 |

(Continued)

OTHER PUBLICATIONS

Chinese language office action dated Apr. 28, 2020, issued in application No. TW 108111140.

(Continued)

*Primary Examiner* — Wei (Victor) Y Chan
(74) *Attorney, Agent, or Firm* — McClure, Qualey & Rodack, LLP

(57) ABSTRACT

A mobile device includes a WLAN (Wireless Local Area Network) module, a WWAN (Wireless Wide Area Network) module, a first antenna element, a second antenna element, a third antenna element, a fourth antenna element, a first switch element, and a second switch element. The WLAN module has a first port, a second port, and a first control port. The WWAN module has a third port, a fourth port, a fifth port, and a sixth port. The first antenna element is coupled to the third port. The first switch element couples the second antenna element to the first port or the fourth port according to a first control signal. The second switch element couples the third antenna element to the second port or the fifth port according to a second control signal. The fourth antenna element is coupled to the sixth port.

12 Claims, 8 Drawing Sheets

(56) References Cited

U.S. PATENT DOCUMENTS

| | | |
|---|---|---|
| 2017/0179997 A1 | 6/2017 | Liao et al. |
| 2018/0063031 A1* | 3/2018 | Wloczysiak .......... H04W 40/02 |
| 2018/0331714 A1* | 11/2018 | See .................... H04B 1/58 |
| 2019/0288736 A1* | 9/2019 | Bai ..................... H04B 7/0602 |
| 2020/0194890 A1* | 6/2020 | Hung ................. H01Q 5/50 |

FOREIGN PATENT DOCUMENTS

| | | |
|---|---|---|
| CN | 105634569 A | 6/2016 |
| CN | 106911350 A | 6/2017 |
| WO | 2017/206814 A1 | 12/2017 |

OTHER PUBLICATIONS

Chinese language office action dated Jan. 27, 2021, issued in application No. CN 201910285290.1.

* cited by examiner

MOBILE DEVICE

CROSS REFERENCE TO RELATED APPLICATIONS

This Application claims priority of Taiwan Patent Application No. 108111140 filed on Mar. 29, 2019, the entirety of which is incorporated by reference herein.

BACKGROUND OF THE INVENTION

Field of the Invention

The disclosure generally relates to a mobile device, and more particularly, to a mobile device and an antenna structure therein.

Description of the Related Art

Mobile devices such as portable computers, mobile phones, multimedia players, and other hybrid functional portable electronic devices have become more common due to the continuous advancements being made in the field of mobile communication technology. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi, Bluetooth and WiMAX (Worldwide Interoperability for Microwave Access) systems and using frequency bands of 2.4 GHz, 3.5 GHz, 5.2 GHz, and 5.8 GHz.

Antennas are indispensable elements for wireless communication. If an antenna for signal reception and transmission has insufficient bandwidth, it will tend to degrade the communication quality of the relative mobile device. Accordingly, it has become a critical challenge for antenna designers to design a small-size, wideband antenna element in the limited space of a mobile device. Furthermore, the new-generation product trend is toward more antennas being used in a mobile device, so as to achieve higher mobile Internet speeds. However, increasing the total number of antennas without additionally increasing the size of the finished product has become another challenge facing system designers.

BRIEF SUMMARY OF THE INVENTION

In an exemplary embodiment, a mobile device which includes a WLAN (Wireless Local Area Network) module, a WWAN (Wireless Wide Area Network) module, a first antenna element, a second antenna element, a third antenna element, a fourth antenna element, a first switch element, and a second switch element is disclosed. The WLAN module has a first port, a second port, and a first control port. The WWAN module has a third port, a fourth port, a fifth port, and a sixth port. The first antenna element is coupled to the third port. The first switch element couples the second antenna element to the first port or the fourth port according to a first control signal. The second switch element couples the third antenna element to the second port or the fifth port according to a second control signal. The fourth antenna element is coupled to the sixth port. The first control port is arranged for outputting a WLAN state signal. The first control signal and the second control signal are determined according to at least the WLAN state signal.

In some embodiments, both the first antenna element and the fourth antenna element cover a first frequency band. Both the second antenna element and the third antenna element cover the first frequency band or a second frequency band.

In some embodiments, the first frequency band is from 1805 MHz to 2690 MHz, a low-frequency portion of the second frequency band is from 2400 MHz to 2500 MHz, and a high-frequency portion of the second frequency band is from 5150 MHz to 5850 MHz.

In some embodiments, if the WLAN state signal has a low logic level, it will represent that the WLAN module is turned on. If the WLAN state signal has a high logic level, it will represent that the WLAN module is turned off.

In some embodiments, if the WLAN module is turned on, the first switch element will couple the second antenna element to the first port, and the second switch element will couple the third antenna element to the second port. If the WLAN module is turned off, the first switch element will couple the second antenna element to the fourth port, and the second switch element will couple the third antenna element to the fifth port.

In some embodiments, the mobile device further includes an embedded controller configured to generate the first control signal and the second control signal.

In some embodiments, the WWAN module further has a second control port for outputting a WWAN state signal. The embedded controller determines the first control signal and the second control signal according to the WLAN state signal and the WWAN state signal.

In some embodiments, if the WWAN state signal has a low logic level, it will represent that the WWAN module is turned on. If the WWAN state signal has a high logic level, it will represent that the WWAN module is turned off.

In some embodiments, if the WLAN module is turned on and the WWAN module is turned on, the first switch element will couple the second antenna element to the first port, and the second switch element will couple the third antenna element to the second port. If the WLAN module is turned on and the WWAN module is turned off, the first switch element will couple the second antenna element to the first port, and the second switch element will couple the third antenna element to the second port. If the WLAN module is turned off and the WWAN module is turned on, the first switch element will couple the second antenna element to the fourth port, and the second switch element will couple the third antenna element to the fifth port. If the WLAN module is turned off and the WWAN module is turned off, the first switch element will couple the second antenna element to the first port, and the second switch element will couple the third antenna element to the second port.

In some embodiments, the WWAN module further has a third control port for outputting an antenna control signal. The embedded controller determines the first control signal and the second control signal according to the WLAN state signal and the antenna control signal.

In some embodiments, if the antenna control signal has a low logic level, it will represent that the WWAN module is operating in a small MIMO (Multi-Input and Multi-Output) mode. If the antenna control signal has a high logic level, it will represent that the WWAN module is operating in a large MIMO mode.

In some embodiments, if the WLAN module is turned on and the WWAN module is operating in the large MIMO mode, the first switch element will couple the second antenna element to the first port, and the second switch element will couple the third antenna element to the second port. If the WLAN module is turned on and the WWAN module is operating in the small MIMO mode, the first switch element will couple the second antenna element to the first port, and the second switch element will couple the third antenna element to the second port. If the WLAN module is turned off and the WWAN module is operating in the large MIMO mode, the first switch element will couple the second antenna element to the fourth port, and the second switch element will couple the third antenna element to the fifth port. If the WLAN module is turned off and the WWAN module is operating in the small MIMO mode, the first switch element will couple the second antenna element to the first port, and the second switch element will couple the third antenna element to the second port.

In some embodiments, the first port further supports a Bluetooth function, and the WLAN module further has a fourth control port for selectively outputting a WLAN priority signal. If the embedded controller receives the WLAN priority signal, the first switch element will forced to couple the second antenna element to the first port.

In some embodiments, each of the second antenna element and the third antenna element has an antenna structure which includes a ground element, a shorting connection element, a feeding connection element, a first radiation element, a second radiation element, a third radiation element, and a fourth radiation element. The shorting connection element is coupled to the ground element. The first radiation element is coupled to the shorting connection element. The second radiation element is coupled to the shorting connection element. The second radiation element and the first radiation element substantially extend in opposite directions. The feeding connection element has a feeding point. The third radiation element is coupled to the feeding connection element. The fourth radiation element is coupled to the feeding connection element. The fourth radiation element and the third radiation element substantially extend in opposite directions.

In some embodiments, a large T-shaped structure is formed by the combination of the shorting connection element, the first radiation element, and the second radiation element. A small T-shaped structure is formed by the combination of the feeding connection element, the third radiation element, and the fourth radiation element.

In some embodiments, a coupling gap is formed between the large T-shaped structure and the small T-shaped structure, such that the large T-shaped structure is excited by the small T-shaped structure using a coupling mechanism.

In some embodiments, the length of the first radiation element is longer than the length of the second radiation element and the length of the third radiation element. The length of the third radiation element is longer than the length of the fourth radiation element.

In another exemplary embodiment, the invention is directed to an antenna structure which includes a ground element, a shorting connection element, a feeding connection element, a first radiation element, a second radiation element, a third radiation element, and a fourth radiation element. The shorting connection element is coupled to the ground element. The first radiation element is coupled to the shorting connection element. The second radiation element is coupled to the shorting connection element. The second radiation element and the first radiation element substantially extend in opposite directions. The feeding connection element has a feeding point. The third radiation element is coupled to the feeding connection element. The fourth radiation element is coupled to the feeding connection element. The fourth radiation element and the third radiation element substantially extend in opposite directions.

In some embodiments, the antenna structure covers a first frequency band or a second frequency band. The first frequency band is from 1805 MHz to 2690 MHz. A low-frequency portion of the second frequency band is from 2400 MHz to 2500 MHz. A high-frequency portion of the second frequency band is from 5150 MHz to 5850 MHz.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the foregoing and other purposes, features and advantages of the invention, the embodiments and figures of the invention will be described in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1:
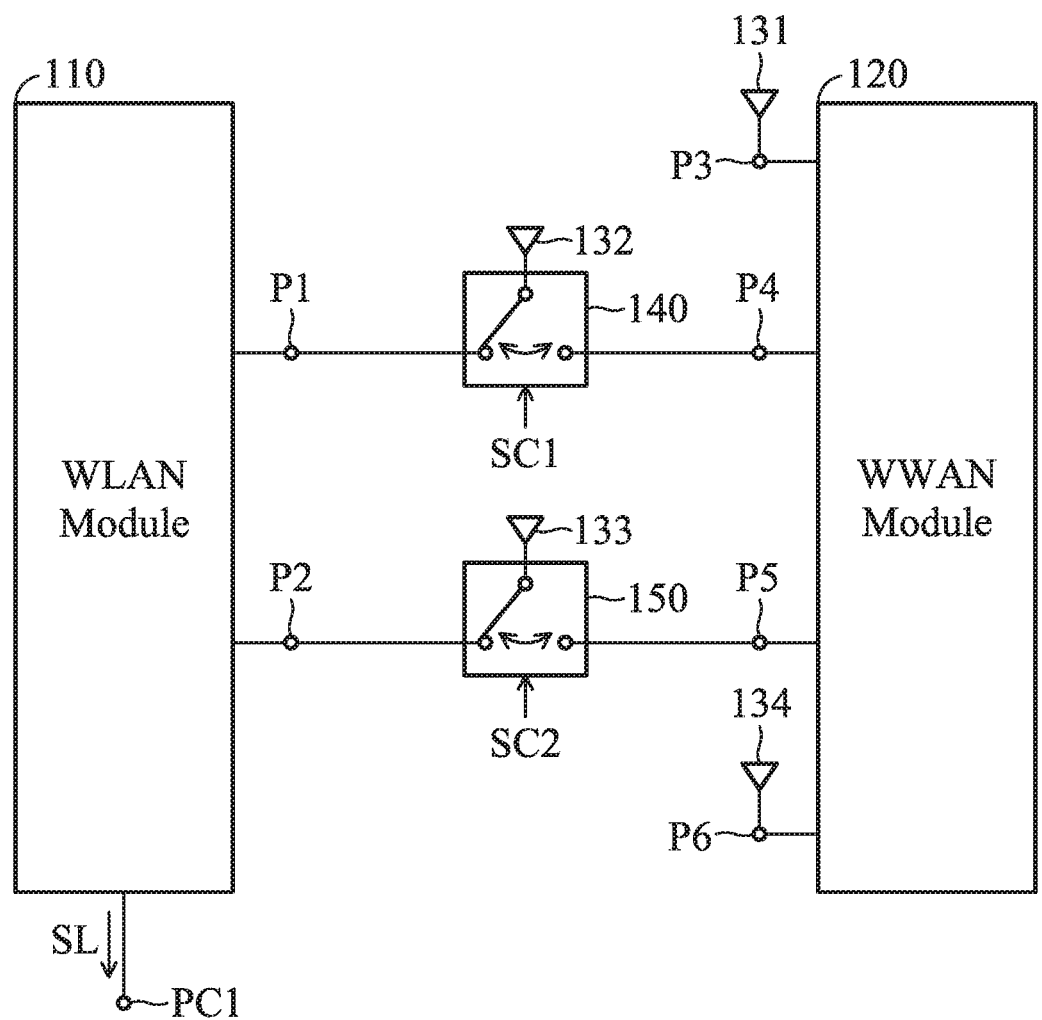
FIG. 1 is a diagram of a mobile device according to an embodiment of the invention.

FIG. 1 is a diagram of a mobile device 100 according to an embodiment of the invention. For example, the mobile device 100 may be a notebook computer, an ACPC (Always Connected Personal Computer) or a tablet computer. As shown in FIG. 1, the mobile device 100 at least includes a WLAN (Wireless Local Area Network) module 110, a WWAN (Wireless Wide Area Network) module 120, a first antenna element 131, a second antenna element 132, a third antenna element 133, a fourth antenna element 134, a first switch element 140, and a second switch element 150. It should be understood that the mobile device 100 may further include other components, such as a display device, a speaker, a touch control module, a power supply module, and a housing although they are not displayed in FIG. 1.

The shapes and types of the first antenna element 131, the second antenna element 132, the third antenna element 133, and the fourth antenna element 134 are not limited in the invention. For example, any of the first antenna element 131, the second antenna element 132, the third antenna element 133, and the fourth antenna element 134 may be a monopole antenna, a dipole antenna, a patch antenna, a PIFA (Planar Inverted F Antenna), a helical antenna, a hybrid antenna, a loop antenna, or a chip antenna.

In some embodiments, both the first antenna element 131 and the fourth antenna element 134 cover a first frequency band, and both the second antenna element 132 and the third antenna element 133 cover the first frequency band or a second frequency band. For example, the first frequency band may be from about 1805 MHz to about 2690 MHz, a low-frequency portion of the second frequency band may be from about 2400 MHz to about 2500 MHz, and a high-frequency portion of the second frequency band may be from about 5150 MHz to about 5850 MHz.

However, the invention is not limited thereto. In alternative embodiments, the first antenna element 131 and the fourth antenna element 134 further cover a third frequency band. A low-frequency portion of the third frequency band may be from about 690 MHz to about 960 MHz. A high-frequency portion of the third frequency band may be from about 3400 MHz to about 3600 MHz (LTE E-UTRA Band 42). With such a design, the first antenna element 131 and the fourth antenna element 134 can correspondingly support the LTE (Long Term Evolution) low-frequency interval (690 MHz to 960 MHz), the LTE median-frequency interval (1805 MHz to 2690 MHz), and the LTE high-frequency interval (3400 MHz to 3600 MHz and 5150 MHz to 5850 MHz). Therefore, in these embodiments, the mobile device 100 supports LTE 4×4 MIMO when operating in the first frequency band or the second frequency band, and the mobile device 100 supports LTE 2×2 MIMO when operating in the third frequency band.

In alternative embodiments, the fourth antenna element 134 further covers the third frequency band and a fourth frequency band from about 1559 MHz to about 1607 MHz. The GPS (Global Positioning System) reception frequency (1575.42 MHz) is within the fourth frequency band. Therefore, the fourth antenna element 134 covering the fourth frequency band can transmit and receive GPS satellite signals.

The WLAN module 110 has a first port P1, a second port P2, and a first control port PC1. The first port P1 and the second port P2 are both arranged for inputting or outputting signals in the second frequency band. The first control port PC1 is arranged for directly or indirectly controlling the switching states of the first switch element 140 and the second switch element 150. The WWAN module 120 has a third port P3, a fourth port P4, a fifth port P5, and a sixth port P6. The third port P3, the fourth port P4, the fifth port P5, and the sixth port P6 are all arranged for inputting or outputting signals in the first frequency band.

The first antenna element 131 is coupled to the third port P3 of the WWAN module 120. The first switch element 140 may be a first SPDT (Single Port Double Throw) switch. The first switch element 140 can couple the second antenna element 132 to either the first port P1 of the WLAN module 110 or the fourth port P4 of the WWAN module 120 according to a first control signal SC1. The second switch element 150 may be a second SPDT switch. The second switch element 150 can couple the third antenna element 133 to either the second port P2 of the WLAN module 110 or the fifth port P5 of the WWAN module 120 according to a second control signal SC2. The fourth antenna element 134 is coupled to the sixth port P6 of the WWAN module 120. With such a design, the first antenna element 131 and the fourth antenna element 134 are always excited by the WWAN module 120, but the second antenna element 132 and the third antenna element 133 are selectively excited by the WLAN module 110 or the WWAN module 120. Because the second antenna element 132 and the third antenna element 133 are shared by the WLAN module 110 and the WWAN module 120, the proposed mobile device 100 can support the multiband operations of Wi-Fi, Bluetooth, and LTE at the same time, without additionally increasing the antenna design area. In some embodiments, if the first antenna element 131 and the fourth antenna element 134 are coupled to the WWAN module 120 and the second antenna element 132 and the third antenna element 133 are coupled to the WLAN module 110, the mobile device 100 can use LTE 2×2 MIMO (Multi-Input and Multi-Output) technology and Wi-Fi 2×2 MIMO technology; and if the first antenna element 131, the second antenna element 132, the third antenna element 133, and fourth antenna element 134 are all coupled to the WWAN module 120, the mobile device 100 can use LTE 4×4 MIMO technology for providing higher transmission speed, such as the requirement of LTE-A (LTE-Advance) standard.

The following embodiments will introduce the operation principles of the mobile device 100. It should be understood that these figures and descriptions are merely exemplary, rather than limitations of the invention.

In some embodiments, the first control port PC1 of the WLAN module 110 is arranged for outputting a WLAN state signal SL. The WLAN state signal SL may be a first indicator-light control signal of a GPIO (General-Purpose Input/Output) interface of the WLAN module 110. For example, if the WLAN state signal SL has a low logic level (e.g., a logic "0"), it may represent that the WLAN module 110 is turned on; and if the WLAN state signal SL has a high logic level (e.g., a logic "1"), it may represent that the WLAN module 110 is turned off. The first control signal SC1 and the second control signal SC2 are determined according to at least the WLAN state signal SL. For example, each of the first control signal SC1 and the second control signal SC2 may be equivalent to the WLAN state signal SL, but it is not limited thereto. There may be a first switching truth table relative to the first switch element 140 and the second switch element 150 as follows.

TABLE 1

First Switching Truth Table

| WLAN state signal | Second antenna Element | Third antenna element |
|---|---|---|
| Low logic level | Coupled to WLAN module | Coupled to WLAN module |
| High logic level | Coupled to WWAN module | Coupled to WWAN module |

According to Table I, if the WLAN module 110 is turned on, the first switch element 140 may couple the second antenna element 132 to the first port P1, and the second switch element 150 may couple the third antenna element 133 to the second port P2; and if the WLAN module 110 is turned off, the first switch element 140 may couple the second antenna element 132 to the fourth port P4, and the second switch element 150 may couple the third antenna element 133 to the fifth port P5. However, the invention is not limited thereto. In other embodiments, the meanings of the high and low logic levels of the WLAN state signal SL are adjustable and exchangeable according to different requirements.

Figure 2:
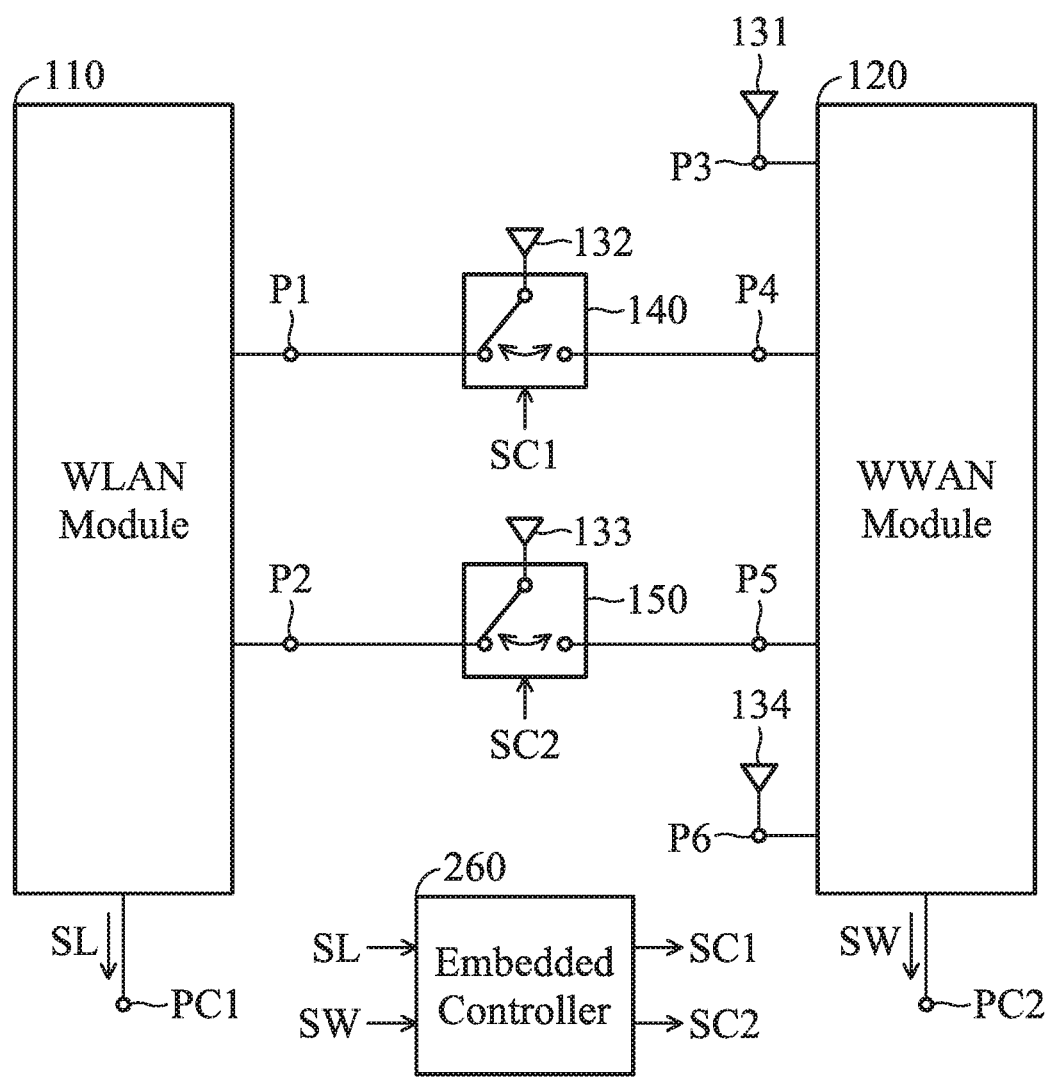
FIG. 2 is a diagram of a mobile device according to an embodiment of the invention.

FIG. 2 is a diagram of a mobile device 200 according to an embodiment of the invention. FIG. 2 is similar to FIG. 1. In the embodiment of FIG. 2, the mobile device 200 further includes an embedded controller 260, and the WWAN module 120 further has a second control port PC2 for outputting a WWAN state signal SW. The WWAN state signal SW may be a second indicator-light control signal of a GPIO interface of the WWAN module 120. For example, if the WWAN state signal SW has a low logic level, it may represent that the WWAN module 120 is turned on; and if the WWAN state signal SW has a high logic level, it may represent that the WWAN module 120 is turned off. The embedded controller 260 can determine the first control signal SC1 and the second control signal SC2 according to both the WLAN state signal SL and the WWAN state signal SW. There may be a second switching truth table relative to the first switch element 140 and the second switch element 150 as follows.

TABLE II

Second Switching Truth Table

| WLAN state signal | WWAN state signal | Second antenna element | Third antenna element |
|---|---|---|---|
| Low logic level | Low logic level | Coupled to WLAN module | Coupled to WLAN module |
| Low logic level | High logic level | Coupled to WLAN module | Coupled to WLAN module |
| High logic level | Low logic level | Coupled to WWAN module | Coupled to WWAN module |
| High logic level | High logic level | Coupled to WLAN module | Coupled to WLAN module |

According to Table II, if the WLAN module 110 is turned on and the WWAN module 120 is turned on, the first switch element 140 may couple the second antenna element 132 to the first port P1, and the second switch element 150 may couple the third antenna element 133 to the second port P2; if the WLAN module 110 is turned on and the WWAN module 120 is turned off, the first switch element 140 may couple the second antenna element 132 to the first port P1, and the second switch element 150 may couple the third antenna element 133 to the second port P2; if the WLAN module 110 is turned off and the WWAN module 120 is turned on, the first switch element 140 may couple the second antenna element 132 to the fourth port P4, and the second switch element 150 may couple the third antenna element 133 to the fifth port P5; and if the WLAN module 110 is turned off and the WWAN module 120 is turned off, the first switch element 140 may couple the second antenna element 132 to the first port P1, and the second switch element 150 may couple the third antenna element 133 to the second port P2. However, the invention is not limited thereto. In other embodiments, the meanings of the high and low logic levels of the WWAN state signal SW are adjustable and exchangeable according to different requirements. Other features of the mobile device 200 of FIG. 2 are similar to those of the mobile device 100 of FIG. 1. Therefore, the two embodiments can achieve similar levels of performance.

Figure 3:
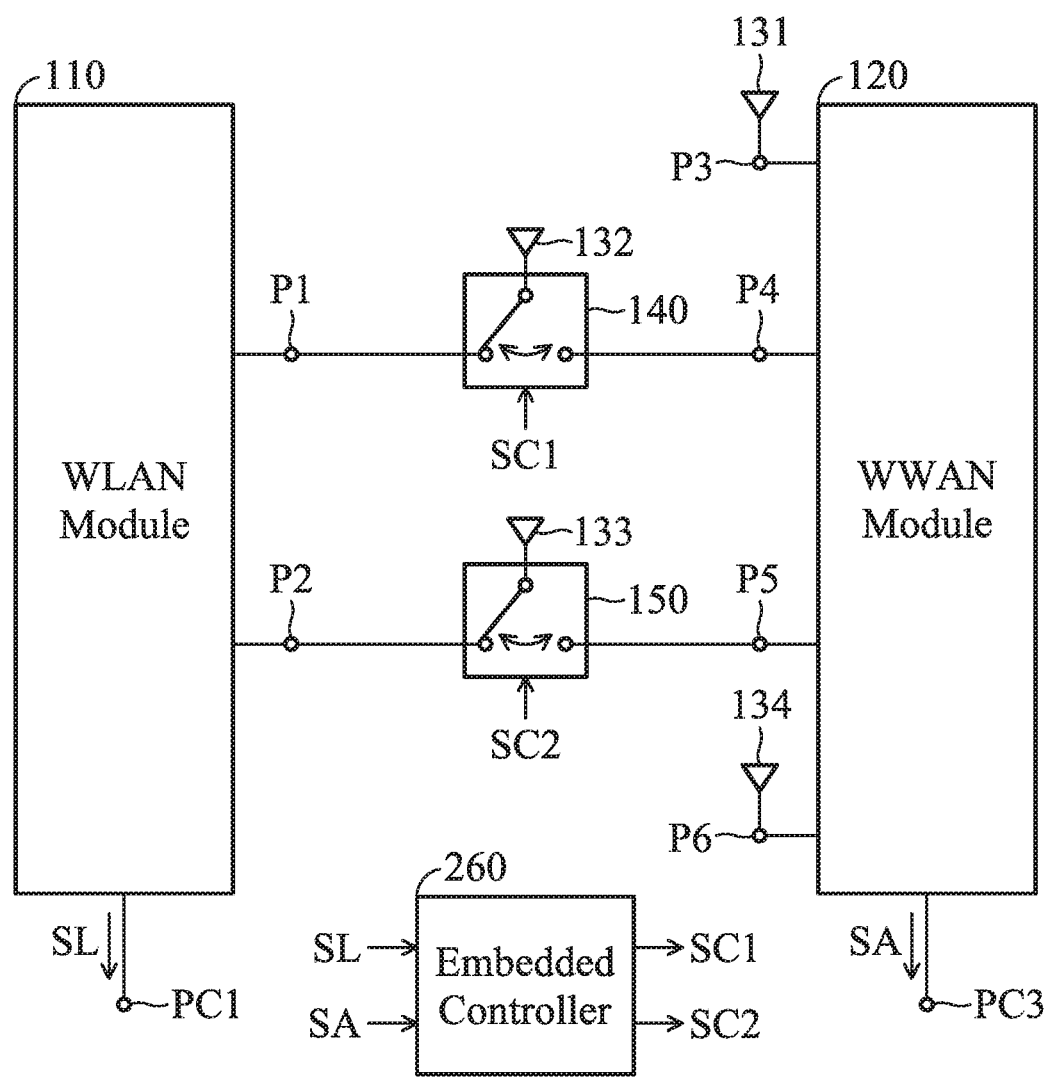
FIG. 3 is a diagram of a mobile device according to an embodiment of the invention.

FIG. 3 is a diagram of a mobile device 300 according to an embodiment of the invention. FIG. 3 is similar to FIG. 1. In the embodiment of FIG. 3, the mobile device 300 further includes an embedded controller 260, and the WWAN module 120 further has a third control port PC3 for outputting an antenna control signal SA. The difference from the aforementioned WWAN state signal SW is that the currently-used operation frequency band of the mobile device 300 can be precisely determined by analyzing the antenna control signal SA, so as to reduce the probability of switching errors. For example, if the antenna control signal SA has a low logic level, it may represent that the WWAN module 120 is operating in a small MIMO mode (e.g., the LTE 2×2 MIMO operation); and if the antenna control signal SA has a high logic level, it may represent that the WWAN module 120 is operating in a large MIMO mode (e.g., the LTE 4×4 MIMO operation). The embedded controller 260 can determine the first control signal SC1 and the second control signal SC2 according to both the WLAN state signal SL and the antenna control signal SA. There may be a third switching truth table relative to the first switch element 140 and the second switch element 150 as follows.

TABLE III

Third Switching Truth Table

| WLAN state signal | Antenna control signal | Second antenna element | Third antenna element |
|---|---|---|---|
| Low logic level | High logic level | Coupled to WLAN module | Coupled to WLAN module |
| Low logic level | Low logic level | Coupled to WLAN module | Coupled to WLAN module |
| High logic level | High logic level | Coupled to WWAN module | Coupled to WWAN module |
| High logic level | Low logic level | Coupled to WLAN module | Coupled to WLAN module |

According to Table III, if the WLAN module 110 is turned on and the WWAN module 120 is operating in the large MIMO mode, the first switch element 140 may couple the second antenna element 132 to the first port P1, and the second switch element 150 may couple the third antenna element 133 to the second port P2; if the WLAN module 110 is turned on and the WWAN module 120 is operating in the small MIMO mode, the first switch element 140 may couple the second antenna element 132 to the first port P1, and the second switch element 150 may couple the third antenna element 133 to the second port P2; if the WLAN module 110 is turned off and the WWAN module 120 is operating in the large MIMO mode, the first switch element 140 may couple the second antenna element 132 to the fourth port P4 and the second switch element 150 may couple the third antenna element 133 to the fifth port P5 and if the WLAN module 110 is turned off and the WWAN module 120 is operating in the small MIMO mode, the first switch element 140 may couple the second antenna element 132 to the first port P1 and the second switch element 150 may couple the third antenna element 133 to the second port P2. However, the invention is not limited thereto. In other embodiments, the meanings of the high and low logic levels of the antenna control signal SA are adjustable and exchangeable according to different requirements. Other features of the mobile device 300 of FIG. 3 are similar to those of the mobile device 100 of FIG. 1. Therefore, the two embodiments can achieve similar levels of performance.

Figure 4:
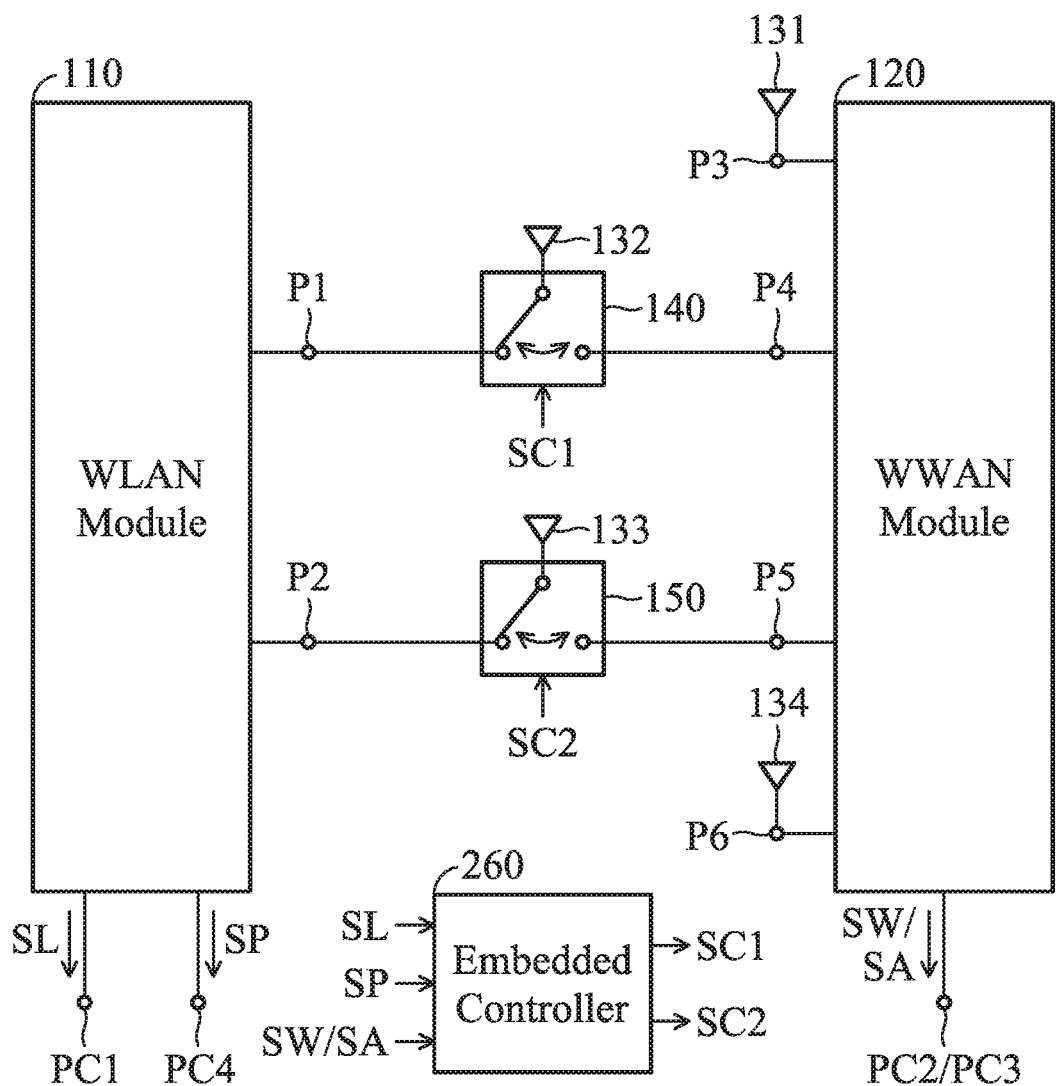
FIG. 4 is a diagram of a mobile device according to an embodiment of the invention.

FIG. 4 is a diagram of a mobile device 400 according to an embodiment of the invention. FIG. 4 is similar to FIG. 2 and FIG. 3. In the embodiment of FIG. 4, the WLAN module 110 of the mobile device 400 further has a fourth control port PC4 for selectively outputting a WLAN priority signal SP. In the WLAN module 110, the first port P1 can support both the Bluetooth function and the Wi-Fi function, but the second port P2 can support only the Wi-Fi function. It should be noted that the Bluetooth function of the WLAN module 110 often corresponds to important accessories, such as a Bluetooth mouse, and therefore the priority of Bluetooth function of the WLAN module 110 should be higher than the use of the WWAN module 120. When the WLAN module 110 needs to have the highest priority, its fourth control port PC4 can generate the WLAN priority signal SP. If the embedded controller 260 receives the WLAN priority signal SP, the first switch element 140 may be forced to couple the second antenna element 132 to the first port P1, regardless of the current logic levels of the WLAN state signal SL, the WWAN state signal SW, and/or the antenna control signal SA. Thus, it may occur that the second antenna element 132 is forced to be coupled to the first port P1 of the WLAN module 110, but the third antenna element 133 is still coupled to the fifth port P5 of the WWAN module 120. Other features of the mobile device 400 of FIG. 4 are similar to those of the mobile devices 200 and 300 of FIG. 2 and FIG. 3. Therefore, these embodiments can achieve similar levels of performance.

According to the embodiments of FIGS. 1 to 4, the invention makes the WLAN module 110 have higher use priority than the WWAN module 120. With such a design, the proposed mobile device not only covers multiple operation frequency bands but also increases the stability of whole communication.

The following embodiments will introduce the antenna structures of the mobile devices 100, 200, 300 and 400. It should be understood that these figures and descriptions are merely exemplary, rather than limitations of the invention.

Figure 5:
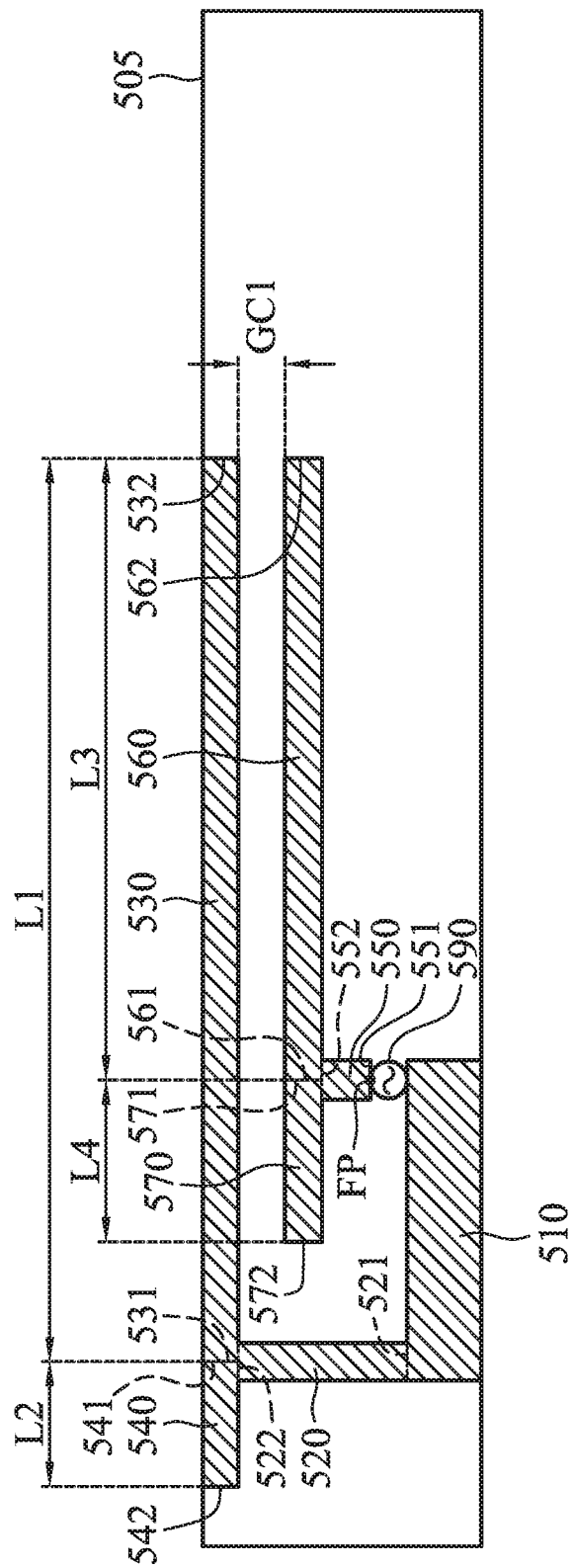
FIG. 5 is a diagram of an antenna structure according to an embodiment of the invention.

FIG. 5 is a diagram of an antenna structure 500 according to an embodiment of the invention. For example, each of the second antenna element 132 and the third antenna element 133 may have an antenna structure 500. In the embodiment of FIG. 5, the antenna structure 500 at least includes a ground element 510, a shorting connection element 520, a first radiation element 530, a second radiation element 540, a feeding connection element 550, a third radiation element 560, and a fourth radiation element 570. The above elements of the antenna structure 500 may all be made of metal materials, and they may all be disposed on a surface of a dielectric substrate 505.

The ground element 510 may be a ground copper foil, which may substantially have a rectangular shape. The ground element 510 is configured to provide a ground voltage. The shorting connection element 520 may substantially have a straight-line shape. The shorting connection element 520 has a first end 521 and a second end 522. The first end 521 of the shorting connection element 520 is coupled to the ground element 510. The first radiation element 530 may substantially have a straight-line shape, which may be substantially perpendicular to the shorting connection element 520. The first radiation element 530 has a first end 531 and a second end 532. The first end 531 of the first radiation element 530 is coupled to the second end 522 of the shorting connection element 520. The second end 532 of the first radiation element 530 is an open end. The second radiation element 540 may substantially have a straight-line shape, which may be substantially perpendicular to the shorting connection element 520. The second radiation element 540 has a first end 541 and a second end 542. The first end 541 of the second radiation element 540 is coupled to the second end 522 of the shorting connection element 520. The second end 542 of the second radiation element 540 is an open end. The second end 542 of the second radiation element 540 and the second end 532 of the first radiation element 530 may substantially extend in opposite directions. The length L1 of the first radiation element 530 may be longer than the length L2 of the second radiation element 540. For example, the length L1 of the first radiation element 530 may be at least 5 times the length L2 of the second radiation element 540. In some embodiments, a large T-shaped structure is formed by the combination of the shorting connection element 520, the first radiation element 530, and the second radiation element 540.

The feeding connection element 550 may substantially have a straight-line shape. The feeding connection element 550 has a first end 551 and a second end 552. A feeding point FP is positioned at the first end 551 of the feeding connection element 550. The feeding point FP may be coupled to a signal source 590. For example, the signal source 590 may be an RF (Radio Frequency) module for exciting the antenna structure 500. The signal source 590 may be equivalent to the first port P1 or the second port P2 of the WLAN module 110, or may be equivalent to the fourth port P4 or the fifth port P5 of the WWAN module 120. The third radiation element 560 may substantially have a straight-line shape, which may be substantially perpendicular to the feeding connection element 550. The third radiation element 560 has a first end 561 and a second end 562. The first end 561 of the third radiation element 560 is coupled to the second end 552 of the feeding connection element 550. The second end 562 of the third radiation element 560 is an open end. The fourth radiation element 570 may substantially have a straight-line shape, which may be substantially perpendicular to the feeding connection element 550. The fourth radiation element 570 has a first end 571 and a second end 572. The first end 571 of the fourth radiation element 570 is coupled to the second end 552 of the feeding connection element 550. The second end 572 of the fourth radiation element 570 is an open end. The second end 572 of the fourth radiation element 570 and the second end 562 of the third radiation element 560 may substantially extend in opposite directions. The length L3 of the third radiation element 560 may be longer than the length L4 of the fourth radiation element 570. For example, the length L3 of the third radiation element 560 may be at least 4 times the length L4 of the fourth radiation element 570. The length L3 of the third radiation element 560 may be shorter than the length L1 of the first radiation element 530. The length L4 of the fourth radiation element 570 may be longer than or equal to the length L2 of the second radiation element 540. In some embodiments, a small T-shaped structure is formed by the combination of the feeding connection element 550, the third radiation element 560, and the fourth radiation element 570. A coupling gap GC1 is formed between the large T-shaped structure and the small T-shaped structure (e.g., the coupling gap GC1 may be mainly positioned between the first radiation element 530 and the third radiation element 560), such that the large T-shaped structure is excited by the small T-shaped structure using a coupling mechanism.

Figure 6:
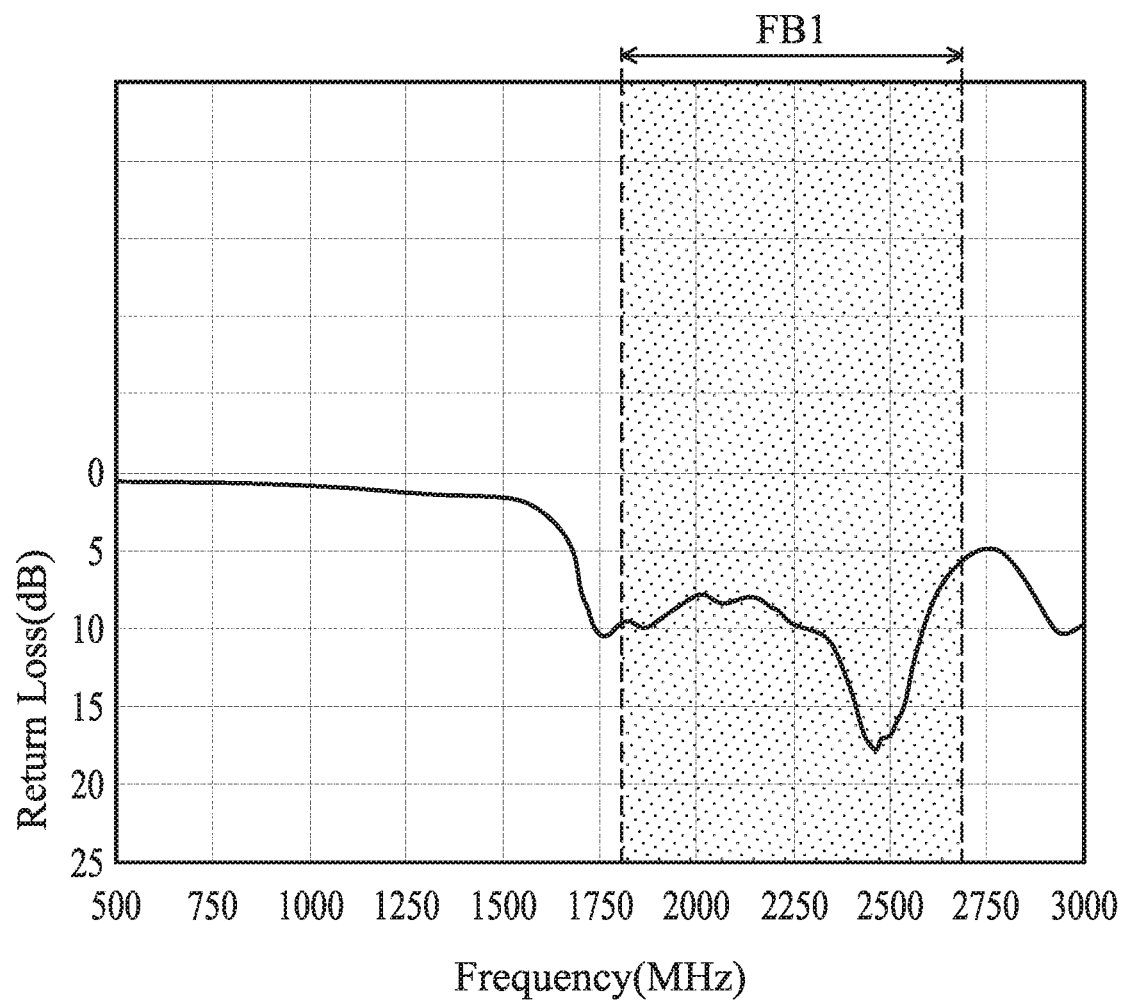
FIG. 6 is a diagram of return loss of an antenna structure according to an embodiment of the invention.
Figure 7:
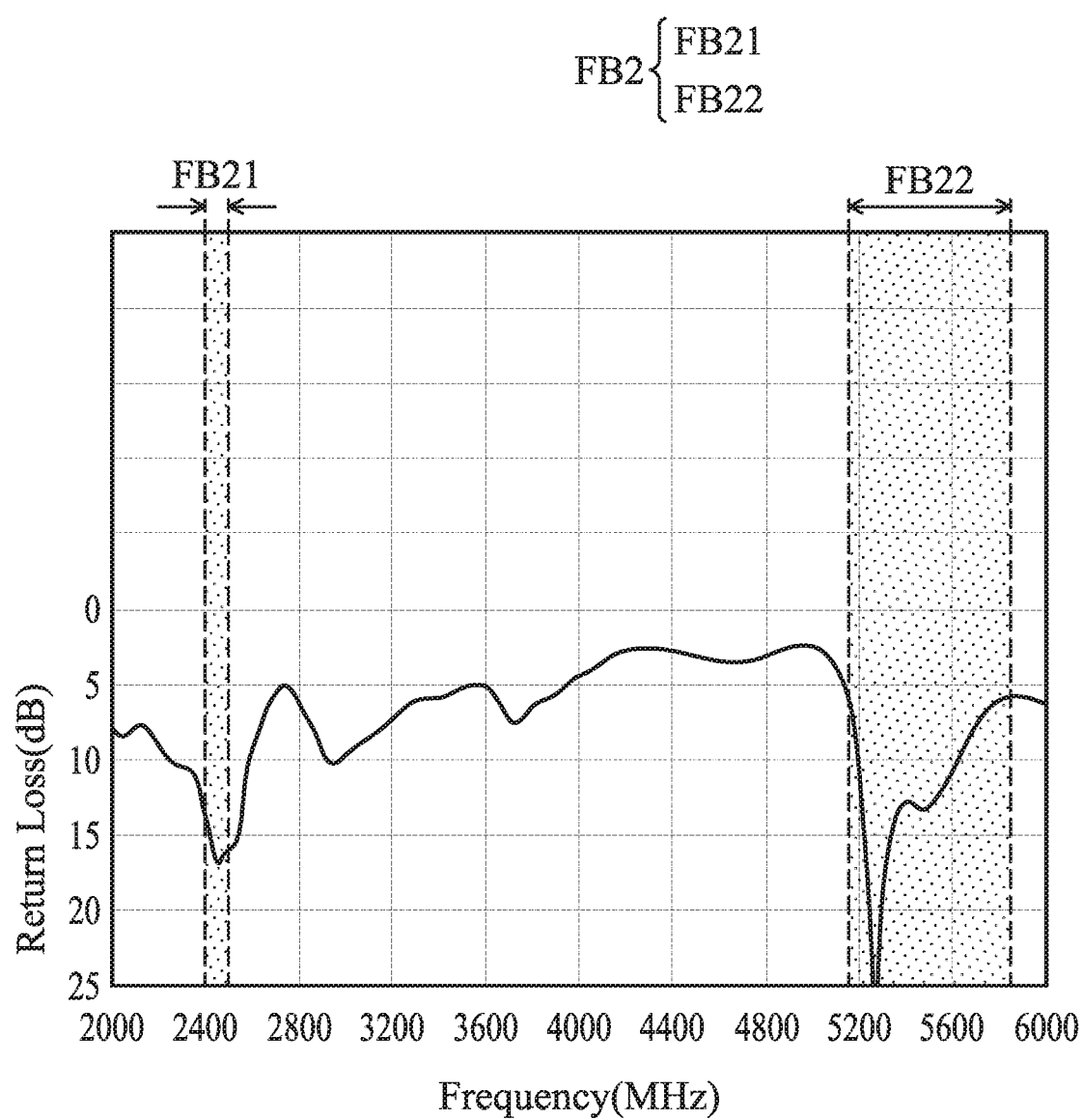
FIG. 7 is a diagram of return loss of an antenna structure according to an embodiment of the invention.

FIG. 6 is a diagram of return loss of the antenna structure 500 according to an embodiment of the invention. In the embodiment of FIG. 6, the antenna structure 500 is coupled to any port of the WWAN module 120. According to the measurement of FIG. 6, the antenna structure 500 can cover a first frequency band FB1. The first frequency band FB1 may be from about 1805 MHz to about 2690 MHz. FIG. 7 is a diagram of return loss of the antenna structure 500 according to an embodiment of the invention. In the embodiment of FIG. 7, the antenna structure 500 is coupled to any port of the WLAN module 110. According to the measurement of FIG. 7, the antenna structure 500 can cover a second frequency band FB2. A low-frequency portion FB21 of the second frequency band FB2 may be from about 2400 MHz to about 2500 MHz. A high-frequency portion FB22 of the second frequency band FB2 may be from about 5150 MHz to about 5850 MHz. Therefore, the antenna structure 500 can support the multiband operations of Wi-Fi, Bluetooth, and LTE.

In some embodiments, the operation principles of the antenna structure 500 are described as follows. The first radiation element 530, the third radiation element 560, and the fourth radiation element 570 are excited to generate the first frequency band FB1. The third radiation element 560 is excited to generate the low-frequency portion FB21 of the second frequency band FB2. The second radiation element 540, the third radiation element 560, and the fourth radiation element 570 are excited to generate the high-frequency portion FB22 of the second frequency band FB2.

In some embodiments, the element sizes of the antenna structure 500 are described as follows. The length L1 of the first radiation element 530 may be substantially equal to 0.25 wavelength ($\lambda/4$) of the lowest frequency of the first frequency band FB1. The length L2 of the second radiation element 540 may be substantially equal to 0.25 wavelength ($\lambda/4$) of the high-frequency portion FB22 of the second frequency band FB2. The length L3 of the third radiation element 560 may be substantially equal to 0.25 wavelength ($\lambda/4$) of the low-frequency portion FB21 of the second frequency band FB2. The length L4 of the fourth radiation element 570 may be substantially equal to 0.25 wavelength ($\lambda/4$) of the high-frequency portion FB22 of the second frequency band FB2. The above ranges of element sizes are calculated and obtained according to many experimental results, and they help to optimize the operation bandwidth and impedance matching of the antenna structure 500.

Figure 8:
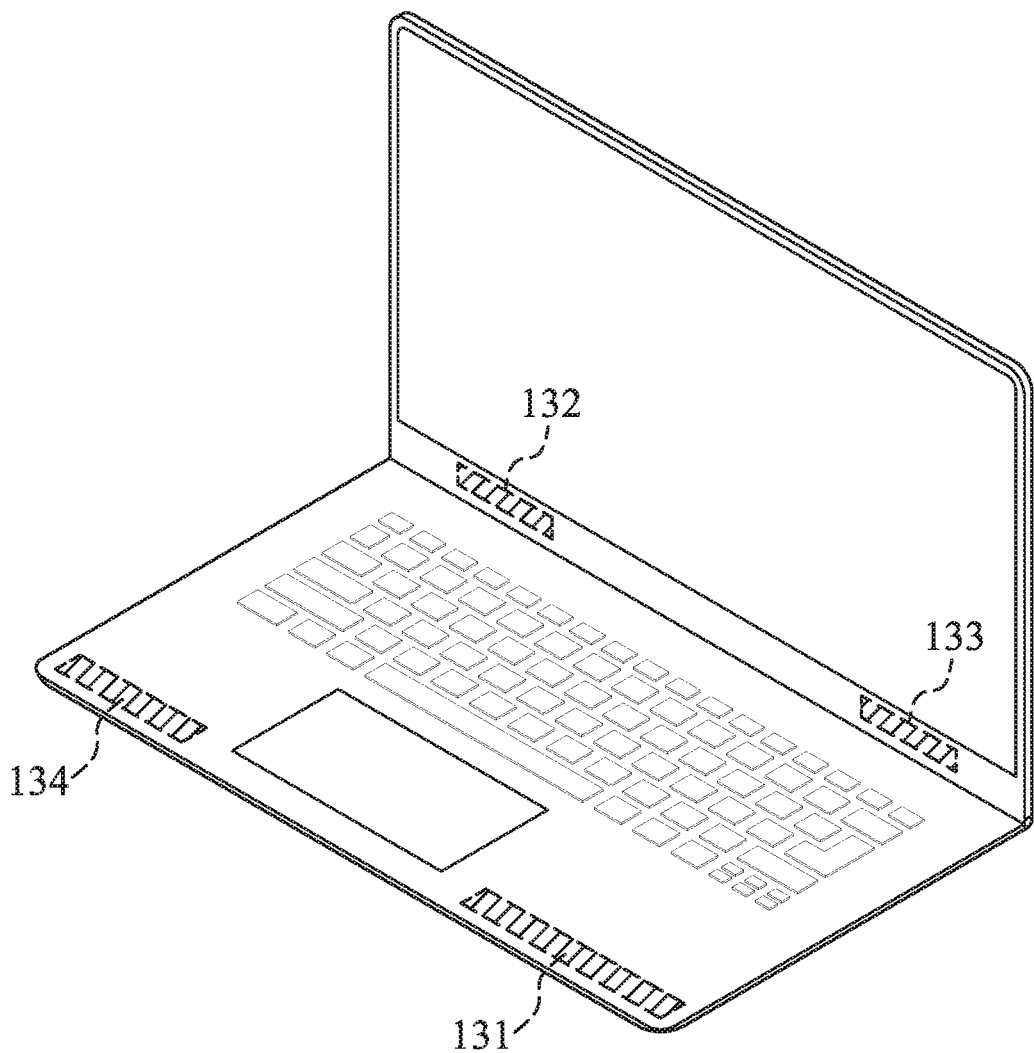
FIG. 8 is a view of a practical product of a mobile device according to an embodiment of the invention.

FIG. 8 is a view of a practical product of a mobile device 800 according to an embodiment of the invention. In the embodiment of FIG. 8, the mobile device 800 is an Always Connected PC. The first antenna element 131 and the fourth antenna element 134 may be disposed adjacent to a keyboard frame of the notebook computer. The second antenna element 132 and the third antenna element 133 may be disposed adjacent to a hinge element of the notebook computer. It should be noted that the positions of the first antenna element 131 and the fourth antenna element 134 may be exchanged with the positions of the second antenna element 132 and the third antenna element 133, without affecting the performance of the invention. With such a design, the mobile device 800 uses only 4 antenna elements to support the functions of both WLAN and WWAN (a conventional design requires at least 6 antennas), and it can help to minimize the total antenna size and improve the whole appearance design.

The invention proposes a novel mobile device including a multiband antenna structure and its corresponding switching mechanism. Generally, the invention has at least the advantages of small size, wide bandwidth, and fewer antennas, and therefore it is suitable for application in a variety of mobile communication devices with narrow borders.

Note that the above element sizes, element shapes, and frequency ranges are not limitations of the invention. An antenna designer can fine-tune these settings or values according to different requirements. It should be understood that the mobile device and antenna structure of the invention are not limited to the configurations of FIGS. 1-8. The invention may include any one or more features of any one or more embodiments of FIGS. 1-8. In other words, not all of the features displayed in the figures should be implemented in the mobile device and antenna structure of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with the true scope of the disclosed embodiments being indicated by the following claims and their equivalents.

What is claimed is:

1. A mobile device, comprising:
   a WLAN (Wireless Local Area Network) module, having a first port, a second port, and a first control port;
   a WWAN (Wireless Wide Area Network) module, having a third port, a fourth port, a fifth port, and a sixth port;
   a first antenna element, coupled to the third port;
   a second antenna element;
   a first switch element, coupling the second antenna element to the first port or the fourth port according to a first control signal;
   a third antenna element;
   a second switch element, coupling the third antenna element to the second port or the fifth port according to a second control signal;
   a fourth antenna element, coupled to the sixth port;
   wherein the first control port is arranged for outputting a WLAN state signal;
   wherein the first control signal and the second control signal are determined according to at least the WLAN state signal;
   wherein the mobile device further comprises:
   an embedded controller, configured to generate the first control signal and the second control signal;
   wherein the WWAN module further has a third control port for outputting an antenna control signal, and the embedded controller determines the first control signal and the second control signal according to the WLAN state signal and the antenna control signal;
   wherein if the antenna control signal has a low logic level, the WWAN module is operating in a small MIMO (Multi-Input and Multi-Output) mode, and if the antenna control signal has a high logic level, the WWAN module is operating in a large MIMO mode.

2. The mobile device as claimed in claim 1, wherein both the first antenna element and the fourth antenna element cover a first frequency band, and both the second antenna element and the third antenna element cover the first frequency band or a second frequency band.

3. The mobile device as claimed in claim 2, wherein the first frequency band is from 1805 MHz to 2690 MHz, a low-frequency portion of the second frequency band is from 2400 MHz to 2500 MHz, and a high-frequency portion of the second frequency band is from 5150 MHz to 5850 MHz.

4. The mobile device as claimed in claim 1, wherein if the WLAN module is turned on, the first switch element couples the second antenna element to the first port and the second switch element couples the third antenna element to the second port, and wherein if the WLAN module is turned off, the first switch element couples the second antenna element to the fourth port and the second switch element couples the third antenna element to the fifth port.

5. The mobile device as claimed in claim 1, wherein the WWAN module further has a second control port for outputting a WWAN state signal, and the embedded controller determines the first control signal and the second control signal according to the WLAN state signal and the WWAN state signal.

6. The mobile device as claimed in claim 5, wherein if the WLAN module is turned on and the WWAN module is turned on, the first switch element couples the second antenna element to the first port and the second switch element couples the third antenna element to the second port, wherein if the WLAN module is turned on and the WWAN module is turned off, the first switch element couples the second antenna element to the first port and the second switch element couples the third antenna element to the second port, wherein if the WLAN module is turned off and the WWAN module is turned on, the first switch element couples the second antenna element to the fourth port and the second switch element couples the third antenna element to the fifth port, and wherein if the WLAN module is turned off and the WWAN module is turned off, the first switch element couples the second antenna element to the first port and the second switch element couples the third antenna element to the second port.

7. The mobile device as claimed in claim 1, wherein if the WLAN module is turned on and the WWAN module is operating in the large MIMO mode, the first switch element couples the second antenna element to the first port and the second switch element couples the third antenna element to the second port, wherein if the WLAN module is turned on and the WWAN module is operating in the small MIMO mode, the first switch element couples the second antenna element to the first port and the second switch element couples the third antenna element to the second port, wherein if the WLAN module is turned off and the WWAN module is operating in the large MIMO mode, the first switch element couples the second antenna element to the fourth port and the second switch element couples the third antenna element to the fifth port, and wherein if the WLAN module is turned off and the WWAN module is operating in the small MIMO mode, the first switch element couples the second antenna element to the first port and the second switch element couples the third antenna element to the second port.

8. The mobile device as claimed in claim 1, wherein the first port further supports a Bluetooth function, the WLAN module further has a fourth control port for selectively outputting a WLAN priority signal, and if the embedded controller receives the WLAN priority signal, the first switch element is forced to couple the second antenna element to the first port.

9. The mobile device as claimed in claim 1, wherein each of the second antenna element and the third antenna element has an antenna structure which comprises:
 a ground element;
 a shorting connection element, coupled to the ground element;
 a first radiation element, coupled to the shorting connection element;
 a second radiation element, coupled to the shorting connection element, wherein the second radiation element and the first radiation element substantially extend in opposite directions;
 a feeding connection element, having a feeding point;
 a third radiation element, coupled to the feeding connection element; and
 a fourth radiation element, coupled to the feeding connection element, wherein the fourth radiation element and the third radiation element substantially extend in opposite directions.

10. The mobile device as claimed in claim 9, wherein a large T-shaped structure is formed by a combination of the shorting connection element, the first radiation element, and the second radiation element, and wherein a small T-shaped structure is formed by a combination of the feeding connection element, the third radiation element, and the fourth radiation element.

11. The mobile device as claimed in claim 10, wherein a coupling gap is formed between the large T-shaped structure and the small T-shaped structure, such that the large T-shaped structure is excited by the small T-shaped structure using a coupling mechanism.

12. The mobile device as claimed in claim 9, wherein a length of the first radiation element is longer than a length of the second radiation element and a length of the third radiation element, and wherein the length of the third radiation element is longer than a length of the fourth radiation element.

* * * * *